Oct. 30, 1934.  H. V. W. SCOTT  1,978,410
MECHANISM FOR KNITTING RUNPROOF OR RUN RESISTANT KNITTED FABRIC
Filed Aug. 11, 1932    11 Sheets-Sheet 1

Inventor:
Herbert V. W. Scott,

Oct. 30, 1934.    H. V. W. SCOTT    1,978,410
MECHANISM FOR KNITTING RUNPROOF OR RUN RESISTANT KNITTED FABRIC
Filed Aug. 11, 1932    11 Sheets-Sheet 4

Inventor:
Herbert V. W. Scott
by Emery, Booth, Varney & Townsend
Attys

Oct. 30, 1934.  H. V. W. SCOTT  1,978,410
MECHANISM FOR KNITTING RUNPROOF OR RUN RESISTANT KNITTED FABRIC
Filed Aug. 11, 1932  11 Sheets-Sheet 5

Oct. 30, 1934.  H. V. W. SCOTT  1,978,410
MECHANISM FOR KNITTING RUNPROOF OR RUN RESISTANT KNITTED FABRIC
Filed Aug. 11, 1932  11 Sheets-Sheet 8

Inventor:
Herbert V. W. Scott,
by [signature]
Attys

Oct. 30, 1934.　　　H. V. W. SCOTT　　　1,978,410
MECHANISM FOR KNITTING RUNPROOF OR RUN RESISTANT KNITTED FABRIC
Filed Aug. 11, 1932　　11 Sheets-Sheet 9

Inventor:
Herbert V. W. Scott
by Emery Booth Varney Townsend
Attys.

Oct. 30, 1934.  H. V. W. SCOTT  1,978,410
MECHANISM FOR KNITTING RUNPROOF OR RUN RESISTANT KNITTED FABRIC
Filed Aug. 11, 1932  11 Sheets-Sheet 10

Inventor:
Herbert V. W. Scott
by Emery, Booth, Varney Townsend
Attys

Oct. 30, 1934.                H. V. W. SCOTT                1,978,410
        MECHANISM FOR KNITTING RUNPROOF OR RUN RESISTANT KNITTED FABRIC
                    Filed Aug. 11, 1932        11 Sheets-Sheet 11

Inventor:
Herbert V. W. Scott,
Attys

Patented Oct. 30, 1934

1,978,410

UNITED STATES PATENT OFFICE 1,978,410

MECHANISM FOR KNITTING RUNPROOF OR RUN-RESISTANT KNITTED FABRIC

Herbert V. W. Scott, Glen Ridge, N. J., assignor to Van Raalte Company, New York, N. Y., a corporation of New York Application August 11, 1932, Serial No. 628,391

15 Claims. (Cl. 66—135)

This invention relates to mechanism for knitting run-proof or run-resistant knitted fabric.

The invention of this application is an improvement upon the invention disclosed in the co-pending applications of Ellsworth E. Carlson, Serial Nos. 541,245, 613,244 and 627,447 which application was filed in substitution for application Ser. No. 613,244.

In accordance with the preferred embodiment of the invention the fabric is a plain fabric made upon a full fashioned hosiery machine.

In order that the principle of the invention may be readily understood, I have disclosed in the accompanying drawings mechanism for making a full fashioned stocking of the general character dtscribed in the original application of the said Carlson, Serial No. 541,245, filed June 1, 1931.

In the said original application of Carlson, Serial No. 541,245 is disclosed a full fashioned stocking and one embodiment of means for making the same. My invention involves certain improvements in that stocking and also involves certain improved means for making such improved stocking. While the said mechanism may be applied to various types of full fashioned knitting machines, I have represented its application to the well known Reading machine, but without limiting the same thereto.

The full fashioned hosiery to which my invention relates is run-proof or very strongly run-resistant in both directions throughout the entire extent of the hosiery. The machine to which my invention is applied is a full fashioned hosiery machine of any desired type and in Figs. 6 to 25 I have represented the same as applied to the well known Reading full fashioned machine.

The machine is in practice provided with the usual number of sections upon each of which is knitted a stocking leg and the heel tabs and the instep of the foot, so as to make an English type of foot, but my invention is not restricted in this respect. I have in the drawings shown only a single section of the machine but it is to be understood that each section of the Reading or other type of machine has my invention applied thereto.

Any suitable hosiery yarn or thread may be employed as the main knitting yarn or thread as, for example, silk, artificial silk, rayon, cotton or wool, and I shall use the words "main thread" broadly to include any such type of thread or others that may be suitable. The main thread may be changed from time to time in knitting the stocking as may be necessary, as, for example, at the end of the welt and in the foot. It will be understood that reinforcing threads may be introduced at desired points, in accordance with practice, particularly in the high splice and in the heel tabs, as well as in the sole and at the toe.

The additional, secondary or warp threads may also be of any suitable material, but they are preferably of silk, and as an important purpose of my invention is to provide a run-stop or strongly run-resistant stocking, the stockings whereof so far as the main thread is concerned are of usual character, I preferably in each instance use additional threads which are of the same character as the main thread, thus giving a uniform structure and appearance to the resulting hosiery, and one which will not be objected to by those who prefer hosiery having the normal or usual stitch so far as the main thread is concerned.

It will be evident that inasmuch as both the main knitting thread and all the warp and additional threads are of the same character (as, for example, real silk), the necessary or inevitable slight difference in thickness of the main knitting thread at different parts of the length due to any cause, will be overcome or neutralized or very greatly minimized by reason of the presence of the said warp or additional threads in the respective needle wales of the main thread, inasmuch as the same inevitable inequalities would be present in the said warp and additional threads, and therefore the general effect will be more or less an equalization or distribution of the said inequalities so as to make them substantially non-observable.

It is highly important that the same tension be maintained upon all the additional or warp threads as upon the main knitting thread, and I have disclosed means for effecting this result so that the fabric is of uniform, even and equal tension throughout.

Figure 16:
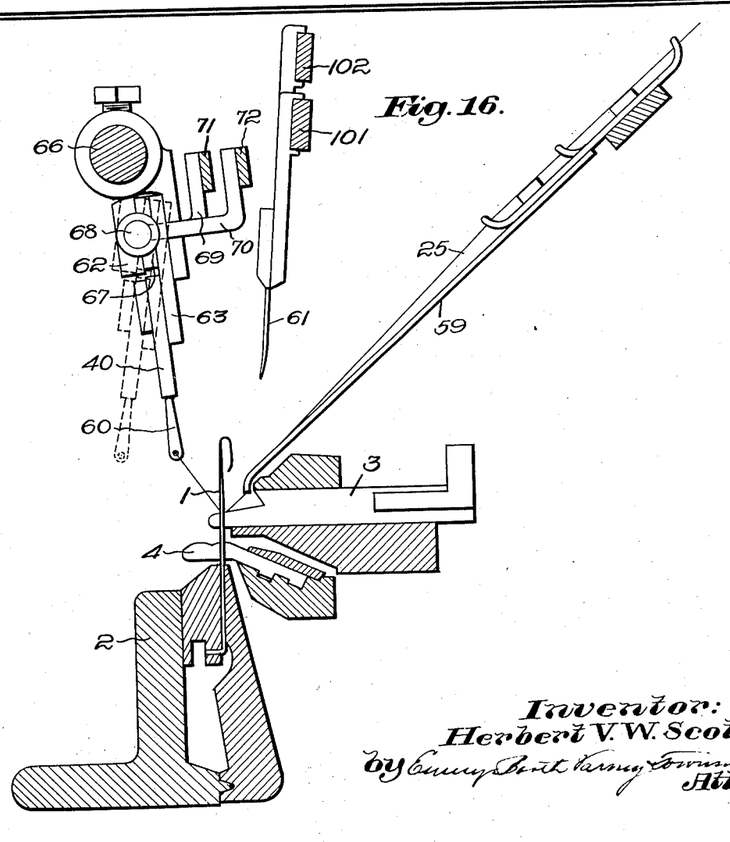
Fig. 16 is a vertical section upon an enlarged scale taken through the knitting instrumentalities to show their relative positions and arrangement.
Figure 17:
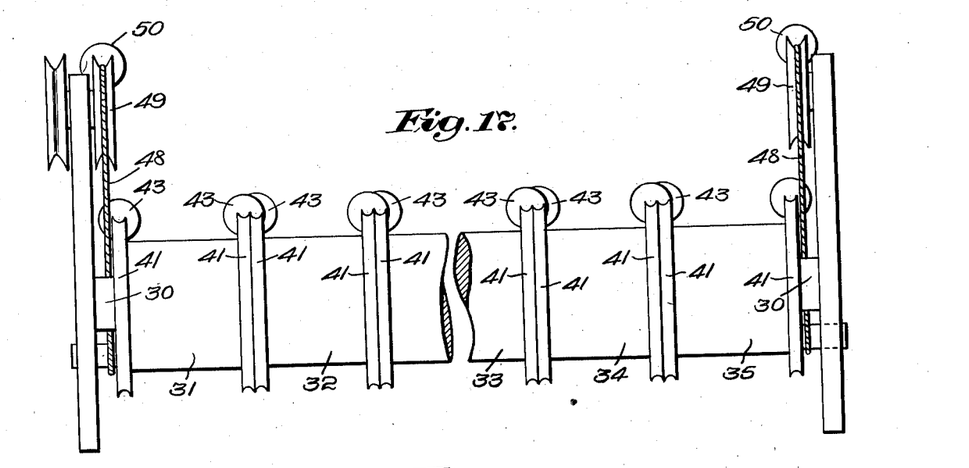
Fig. 17 is a plan view of a portion of the mechanism shown in Fig. 8 and constituting the sectional warp beams for one section of the machine where one stocking blank is knitted.
Figure 18:
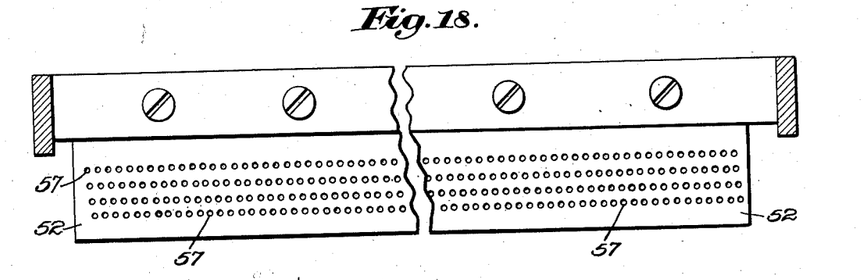
Fig. 18 is a sectional view upon a transverse line 18—18 of Fig. 8 to show how the warp threads are delivered to their respective fingers.

The needles are desirably spring beard needles and are represented as such at 1 in the various figures, reference being particularly made to Fig. 16 wherein the needles are represented as mounted in a needle bar 2 of usual construction. Sinkers, dividers and knocking-over bits are provided as usual, sinkers being represented at 3 and knocking-over bits at 4. I have not indicated the movements of the knitting needles, but it will be understood that such mechanism functions as in that type of full fashioned hosiery machine to which my invention is applied, whether it be a Reading hosiery knitting machine or any other type.

Figures 1, 2:
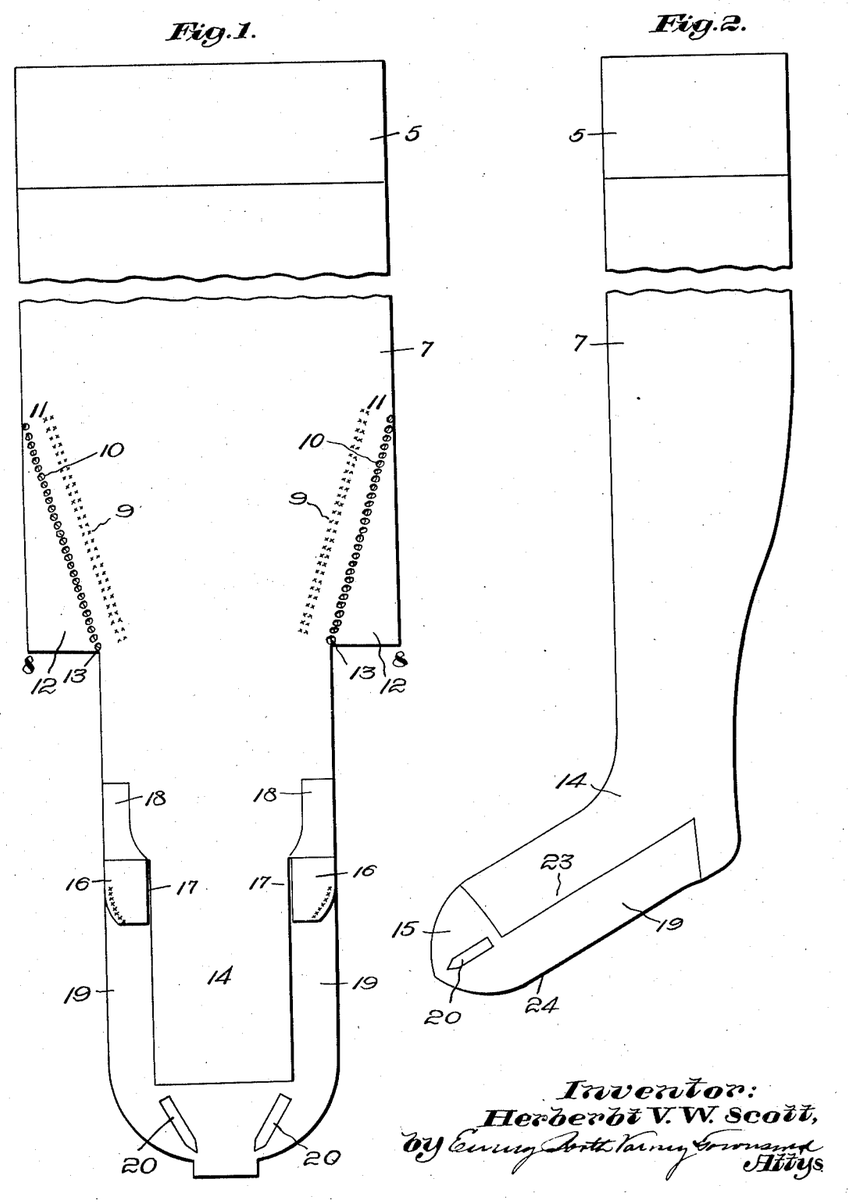
Fig. 1 is a plan view of a blank of an English type of full fashioned stocking having my invention applied thereto or incorporated therein, parts being broken away.
Fig. 2 is a side elevation of the complete stocking made in accordance with my invention but with an intermediate part broken away.

Before proceeding to describe the mechanism for practicing my invention chosen as the preferred embodiment, I will refer to the fabric constructed in accordance with my invention, and will make reference to Figs. 1 to 5 and 20 to 24. In Figs. 1 and 2, the top welt of the full fashioned stocking is represented at 5, and it will be understood that the additional or warp threads, as indicated at 6 in the various figures, may be introduced into the fabric from the very commencement thereof (that is, at the very commencement of the welt), or the welt may be made in the usual manner and turned or closed, and thereupon a lighter main knitting thread may be substituted. At the same time the additional or warp threads 6 may be introduced and their feeding continued throughout the fabric, as will be described in detail. In Figs. 1 and 2, the leg of the stocking is represented at 7. The ankle or lower calf portion is shaped or fashioned. This is preferably done as follows, reference being particularly made to Figs. 1 and 5.

As hereinafter described in detail, I provide a warp thread finger for each individual warp thread, so that each warp thread is introduced to one needle wale only and at all times is restricted thereto. Instead of mounting the warp thread fingers in pairs or singly for movement into and out of functioning position, I mount the fingers in a series of blocks—preferably five—namely, a long central block carrying those fingers which at all times remain in action, two shorter blocks at either side thereof carrying those fingers which during the course of the knitting introduce the warp threads into the heel tabs, and which blocks are at the proper time moved out of action, preferably manually, and two other blocks, one at either end of the needle series, carrying those warp fingers that introduce the warp threads at the salvage portions of the fabric (that is to say, to so much of the sides of the fabric blank as may be comprehended within the fashioning or narrowings).

Figure 5:
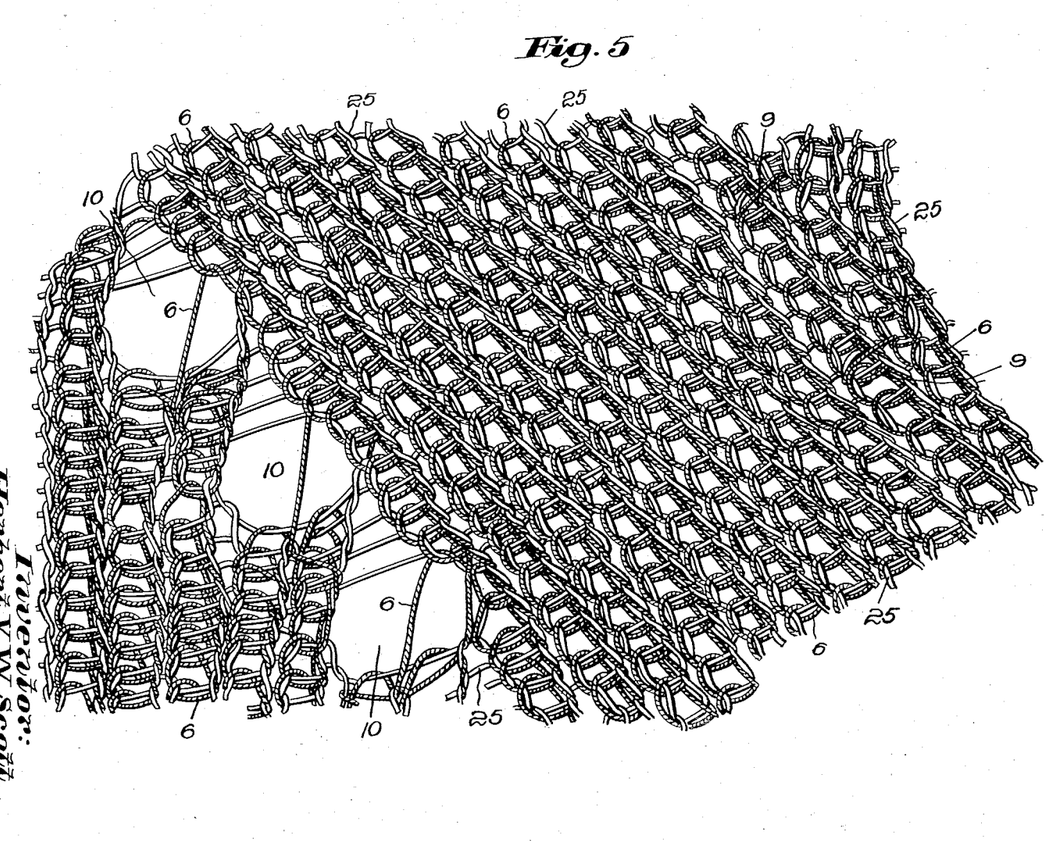
Fig. 5 is a plan view of a portion of the fabric at the narrowings, said view corresponding exactly to a photograph of the fabric made by a microscopic camera.

Upon reference to Fig. 1, it will be observed that the knitting of the fabric is continued of full width down to the transverse line 8—8 and that then the knitting is abruptly terminated upon certain of the needles. Those needles upon which the knitting is thus terminated are the needles whose warp fingers are carried by the outermost blocks, one at either end of the entire row or series of warp thread fingers. Nevertheless the stitches are transferred inward as indicated in Fig. 1 at 9—9 by means of narrowing points, which may be of the usual number at each side or edge of the blank. Each stitch is transferred inward to the extent of one or two needles, but desirably not more than two, but the traverse of the main thread carrier is continued for the full width of the fabric down to the line 8—8. Inasmuch as the warp threads 6 introduced by the fingers of the two end-most blocks, remain in action because the blocks are not as yet moved into non-functioning position, it will be evident that the warp threads continue to be supplied to the same identical needles as before although certain stitches are laterally shifted inward as indicated at 9. The result, however, is to provide an inclined line of small openings 10 along each side of the fabric from a transverse line 11—11 down to the transverse line 8—8. In Fig. 5, I have exactly represented this structure of the fabric and it will be observed that each of said openings 10 is traversed by at least one warp thread, such threads becoming at once incorporated in the further knitting of the fabric in the triangular portions 12—12 shown in Fig. 1. After the knitting of the entire blank has been completed I trim off each edge along the line of holes 10—10. This leaves entirely acceptable edges because of the non-run character of the fabric, and the two inclined edges are then seamed together in the customary manner and will show the two lines 9—9 of transferred stitches at each side of the seam.

I find that in practice it is desirable to narrow or fashion by transferring stitches to the extent of one needle only, because this lessens the distance that the warp threads are displaced from their normal position, to which normal position they at once return, as elsewhere set forth herein. It will be observed that in the right hand side of Fig. 5 appears several of the actual narrowings, the same being also indicated in Fig. 1.

When the knitting has progressed to the line 8—8, the transverse reciprocation of the main thread carrier is reduced in an automatic manner, and desirably by substantially the means set forth in the application of Carlson Ser. No. 627,447, above referred to, so that the traverse terminates at the points 13—13 of Fig. 1, and thereafter the fabric is knitted parallel sided excepting as will be described. At the termination of the heel tabs the traverse of the main thread carrier is further reduced by the same means.

It will be understood that the stocking blank will be seamed along all selvage edges, and also at usual points for an English type of foot, to which type my invention is not restricted.

The instep or top of the foot portion of the stocking is represented at 14 and it will be understood that my invention is of peculiar advantage with the so-called English type of foot, because the additional warp threads 6 continue without interruption from the top of the stocking down the leg and instep to the toe 15. The heel tabs are indicated at 16—16 and at their inner edges are separated from the instep fabric as represented most clearly at 17—17, Fig. 1. The high splice portions are indicated at 18—18 and are provided by the usual additional traversing thread carriers for the reinforcing threads, and the movements of such additional thread carriers are controlled in usual manner. The sole portions of the stocking blank or foot are indicated at 19—19, and the toe portion 15 is provided with customary narrowings 20. Narrowings are also provided in the heel tabs as represented at 21 in Fig. 21, and in the sides of the foot adjacent to the heel tabs as represented at 22—22 in Fig. 21.

It will be understood that the stocking represented in said figures is seamed along both sides of the foot as indicated at 23 in Fig. 2 and also along the bottom of the foot as indicated at 24 in said figure.

Figure 20:
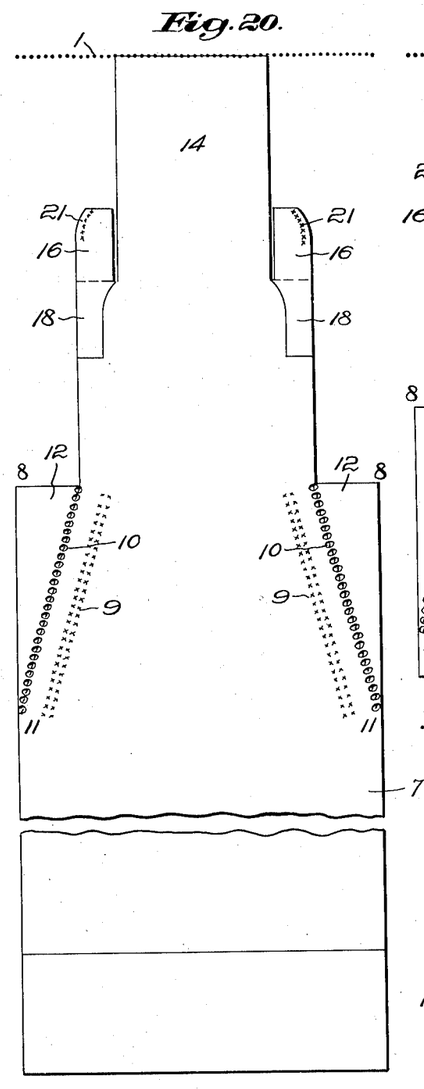
Fig. 20 is a somewhat diagrammatic representation of a stocking blank as it comes from the knitting needles, said figures representing the knitting as having progressed into the top of the foot, the stocking blank therefore still being upon the legger.

In order that the method of knitting the foot and adjacent parts may be entirely clear, I have in Fig. 20 indicated the stocking blank as suspended from or coming from the needles 1. In Fig. 20, the knitting upon the legger has progressed to a point at or approximately at the end of the instep, the fabric being upon the needles and above the knocking-over bits in the usual knitting position. The heel tabs 16—16 have been completed and are no longer upon the needles.

Figure 21:
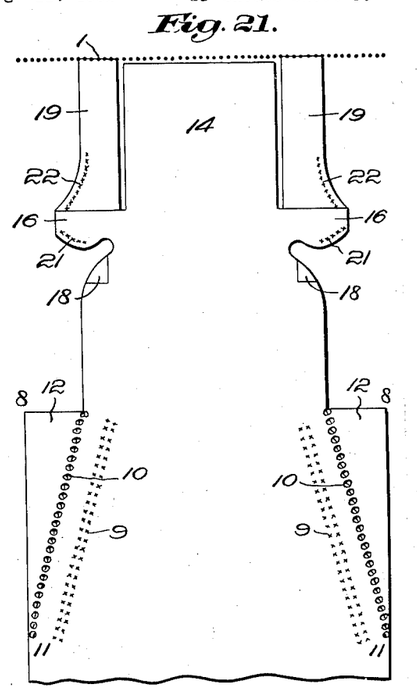
Fig. 21 is a similar view but representing the stocking blank as now upon the footer.
Figure 22:
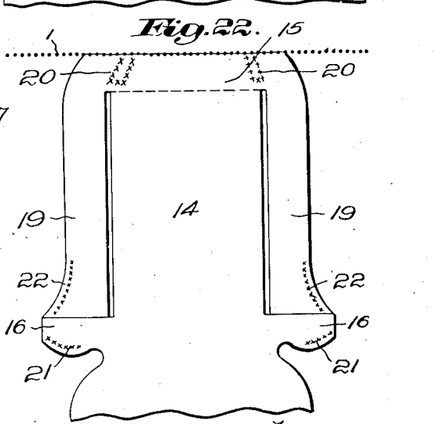
Fig. 22 is a similar view but representing the knitting as having progressed into the toe.
Figure 23:
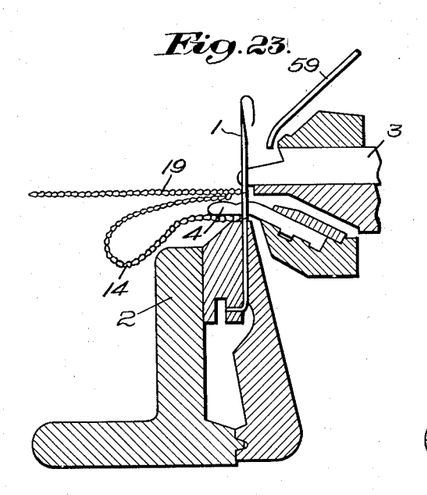
Figs. 23 and 24 are vertical sections taken through the knitting elements and diagrammatically indicating the position of the fabric when the knitting thereof has progressed to the points respectively indicated in Figs. 21 and 22.
Figure 24:
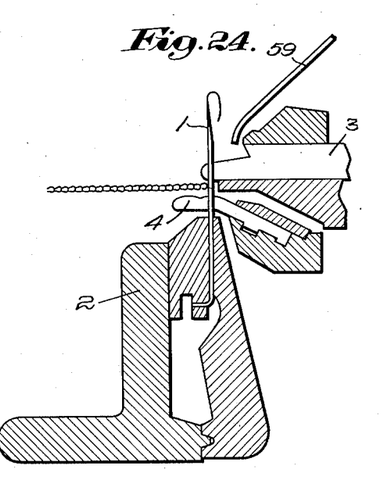

The fabric is now transferred from the legger to the footer. The position of the fabric shown in Fig. 21 is that represented in Fig. 23. The instep portion 14 is represented in Fig. 23 diagrammatically and is still upon the needles but below the knocking-over bits 4. To position the said instep portion 14 below the knocking-over bits 4, the needle bar 2 is swung away from the knocking-over bits momentarily. The heel tabs 16 are turned outwardly as represented in Fig. 21 and are positioned in customary manner upon the needles and thereupon the sides 19—19 of the foot are knitted, such fabric being diagrammatically indicated in Fig. 23 as upon the needles 1 above the knocking-over bits. The knitting continues upon the footer to complete the sides 19 and the toe 15.

It will be understood that the warp threads 6 may and preferably do continue throughout the heel tabs 16 and may be provided in the side portions 19 of the foot.

Figure 3:
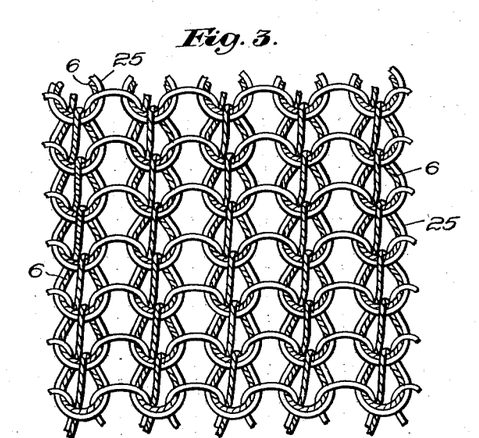
Figs. 3 and 4 are enlarged plan views of the fabric viewed respectively from the outside and from the inside.
Figure 4:
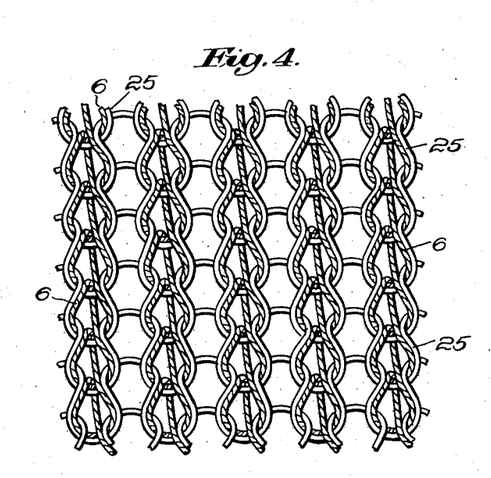

Referring to the structure of the fabric which is diagrammatically illustrated in Figs. 3 and 4 and is precisely represented in Fig. 5, it will be understood that the additional or warp threads 6 are interknitted as shown in said figures. The main knitting thread is indicated at 25. Each warp thread 6 is introduced to all the loops of its own needle wale only, with the exception only of the structure represented most accurately in Fig. 5 and which has been already explained. Each warp thread 6 lies in parallelism with the loop of the main knitting thread 25 inside such loop and is so uniformly positioned with respect thereto because of the equality of the tension of the main knitting thread and the additional or warp threads, that the fabric and its constituent threads all lie in an even, uniform and equal tension. Therefore, the fabric is as readily expansible as any knitted fabric and is as expansible longitudinally as any knitted fabric is longitudinally expansible. In other words, the incorporation of the additional or warp threads 6, needle wale for needle wale, does not decrease the expansibility of the fabric nor are the additional threads observable, except by a microscopic or similar examination, especially when the main knitting thread 25 and the additional or warp threads 6 are of the same texture, color and character as is desirable. The warp threads 6 do not enter into or become incorporated in the sinker wales, and their presence in the needle wales prevents a run in those needle wales, inasmuch as the additional or warp threads extend lengthwise the wales, whereas the main knitting thread extends transversely of the wales.

It will be understood that the fabric is knitted as rapidly as a fabric with plain loops is knitted of only a main thread.

Having described one embodiment of the stocking, I will now describe the application of the mechanism of my invention to the well known Reading type of machine, but merely for purposes of illustration and without limiting my invention to such type of machine. In Figs. 6 to 19, I have represented one end portion only of a Reading type of full fashioned knitting machine, and that merely sufficiently to show the application of my invention to one section thereof, but it is to be understood that all the sections of the machine, whether it be a legger or a footer, are provided with means for properly introducing the warp threads each into one needle wale of the fabric.

Figures 8, 9:
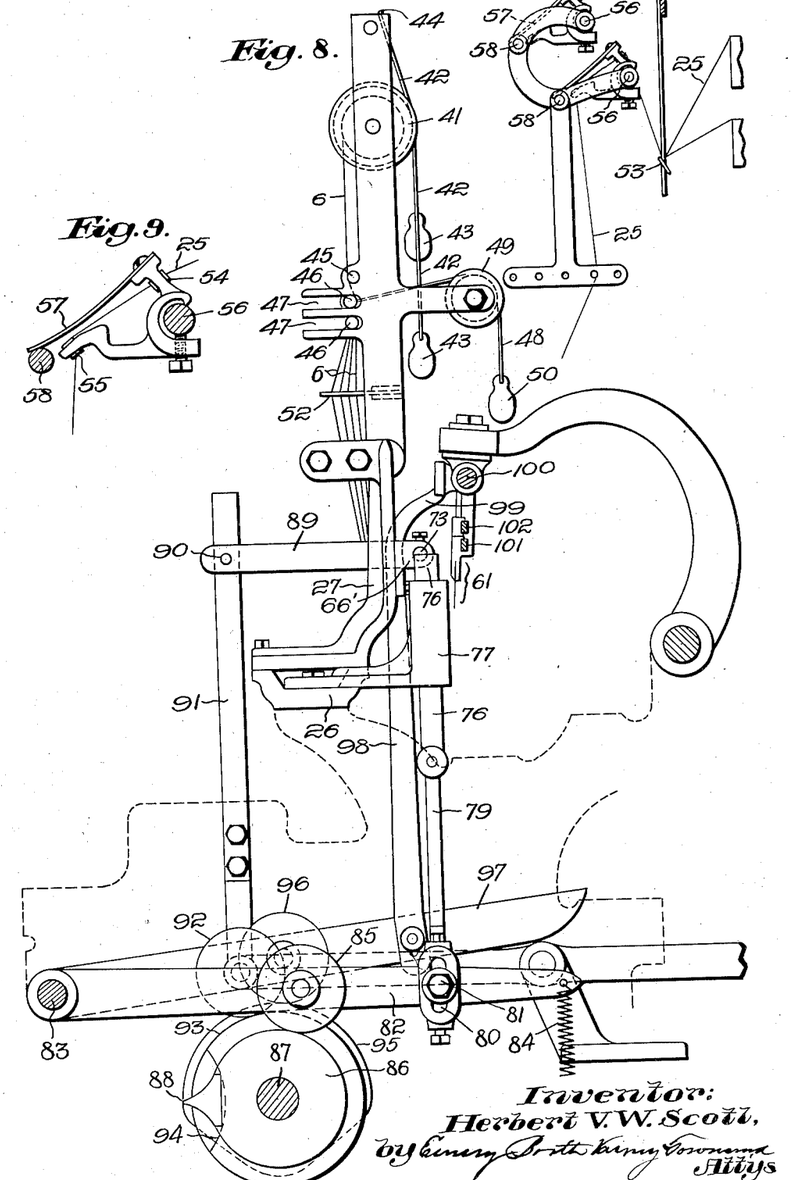
Fig. 8 is an end elevation of the mechanism shown in Fig. 6.
Fig. 9 is an enlarged detail, mainly in side elevation, of means for feeding and tensioning the main knitting thread.
Figure 10:
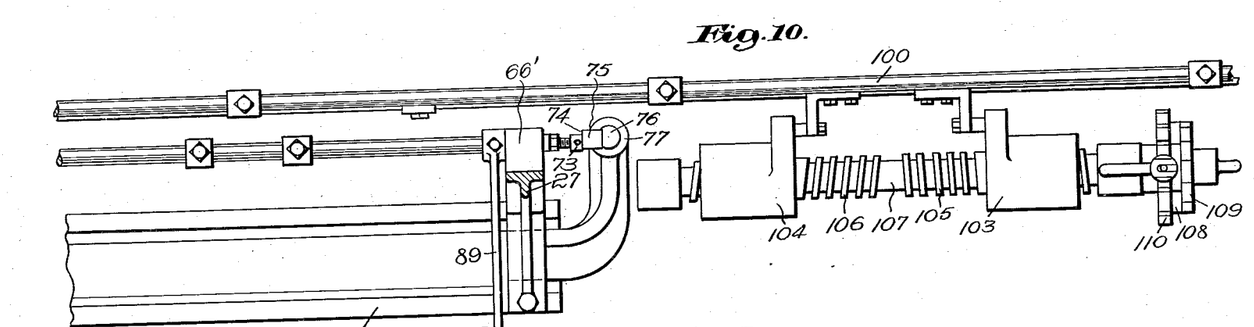
Figs. 10 and 11 are respectively a plan view and a front elevation of means for moving the narrowing points.

Referring first to Figs. 6 to 9, Fig. 6 represents a front elevation and Fig. 8 an end elevation of the right hand end of a Reading machine. A horizontal portion of the framing is indicated at 150

26. Upstanding therefrom and suitably bolted thereto at each end of the machine frame there is a bracket 27 and at the inner or left hand end of the first section and at a corresponding place for each section except the endmost section at the left, there is an upright 28 similarly bolted to the frame 26. Adjacent uprights 27, 28 are connected together by a suitable tie rod 29, and this structure is repeated throughout the machine.

I preferably provide the following mechanism for introducing the warp threads to the individual fingers, one for each knitting needle. A shaft 30 is supported in the uprights 27, 28 and extends the entire length of the machine. Upon that portion of the shaft between each two next adjacent uprights I provide in this embodiment of my invention five warp spools indicated in Figs. 6 and 17 as 31, 32, 33, 34, 35. These spools are all loose upon the shaft 30 but are restrained from rotation by the means to be described. The length of the said spools corresponds to the length of the blocks in which are mounted the warp thread fingers, said blocks being indicated at 36, 37, 38, 39, 40 in Figs. 13 and 15. Upon each end of each spool is a flange 41 and as shown most clearly in Figs. 8 and 17, a series of cords 42 having weights 43 at their lower ends are passed about or lie in contact with a sufficient part of the periphery of said flanges to retard or restrain their feeding movement. The cords 42 are all secured as indicated at 44 at the top of the framing.

The individual warp threads are wound upon the respective spools and feed off therefrom during the knitting operation, it being understood that my invention is not limited to the use of a series of spools.

Figure 11:
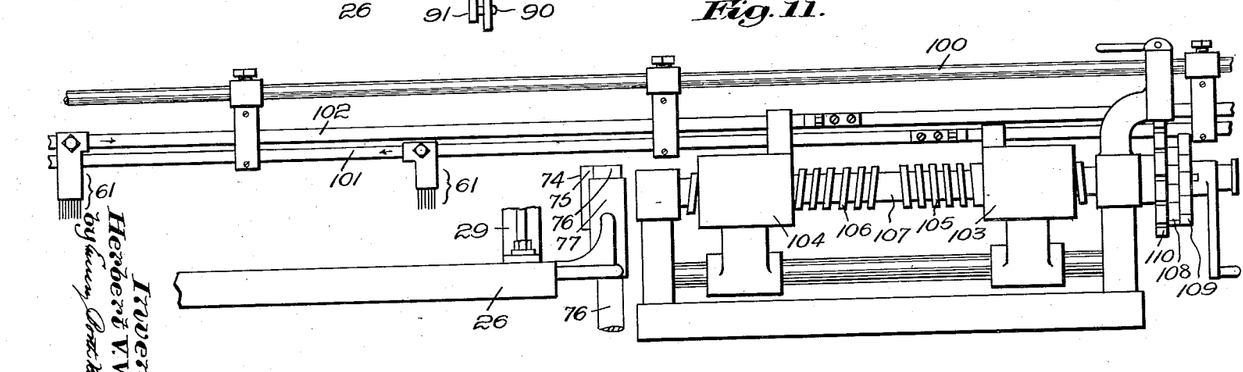
Figure 19:
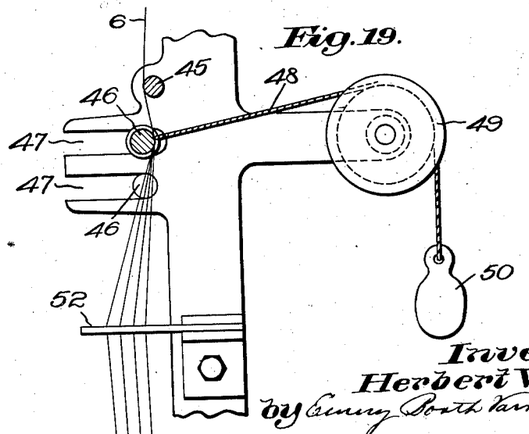
Fig. 19 is a vertical section taken through the mechanism shown in Fig. 17 and looking toward the left in said Fig. 17.

A suitable tensioning means is provided for the warp threads 6 and for this purpose I have represented in Figs. 8 and 19 a guide bar 45, extending one half or the entire length of the machine, and also a friction bar 46 of suitable length, one for each section of the machine, which is supported for suitable transverse play in a slot 47 in each of the necessary uprights. About said rod 46 is passed a cord 48 that extends over a small roll or drum 49 and is weighted at its end as indicated at 50. The said warp threads on their way to the individual fingers pass through suitable openings 51 in a plate 52 shown in Figs. 8, 18 and 19. In this way, a suitable tension is maintained about all the warp threads and is maintained the same as the tension upon the main knitting thread 25. Said main knitting thread 25 is brought from any suitable source of supply and as shown in Fig. 8 may extend to suitable guides 53 and then through guide eyes 54, 55 shown in Fig. 9 as provided upon a rocking member mounted upon a stud or shaft 56 in such manner that the main thread 25 may be moved from time to time against a tension spring 57 bearing upon a rod 58. The main thread carrier is indicated at 59 in Fig. 16 in suitable relation to the needles, and in said figure is represented at 60 one of the warp thread fingers. At 61 is represented one of the narrowing points which in their entirety are also represented in Fig. 11.

As most clearly shown in Figs. 6, 13, 14 and 16, the fingers 60 are mounted rigidly in the several blocks 36, 37, 38, 39, 40. Said blocks are all secured to longitudinally extending members 62, 63 supported by collars 64, 65 upon a longitudinally extending rod 66. The structure is such that the blocks 36, 37, 39, 40 may be swung, preferably and as herein disclosed manually, sufficiently outward or to the left viewing Figs. 14 and 16, to withdraw their warp threads from the corresponding needles. The blocks 36, 40 are so swung into non-functioning position when the knitting has proceeded down to the transverse line 8—8 of Fig. 1, and the blocks 37, 39 are similarly swung out of functioning position when the knitting has progressed down to the end of the heel tabs 16—16 of Fig. 1.

Figures 12, 13, 14:
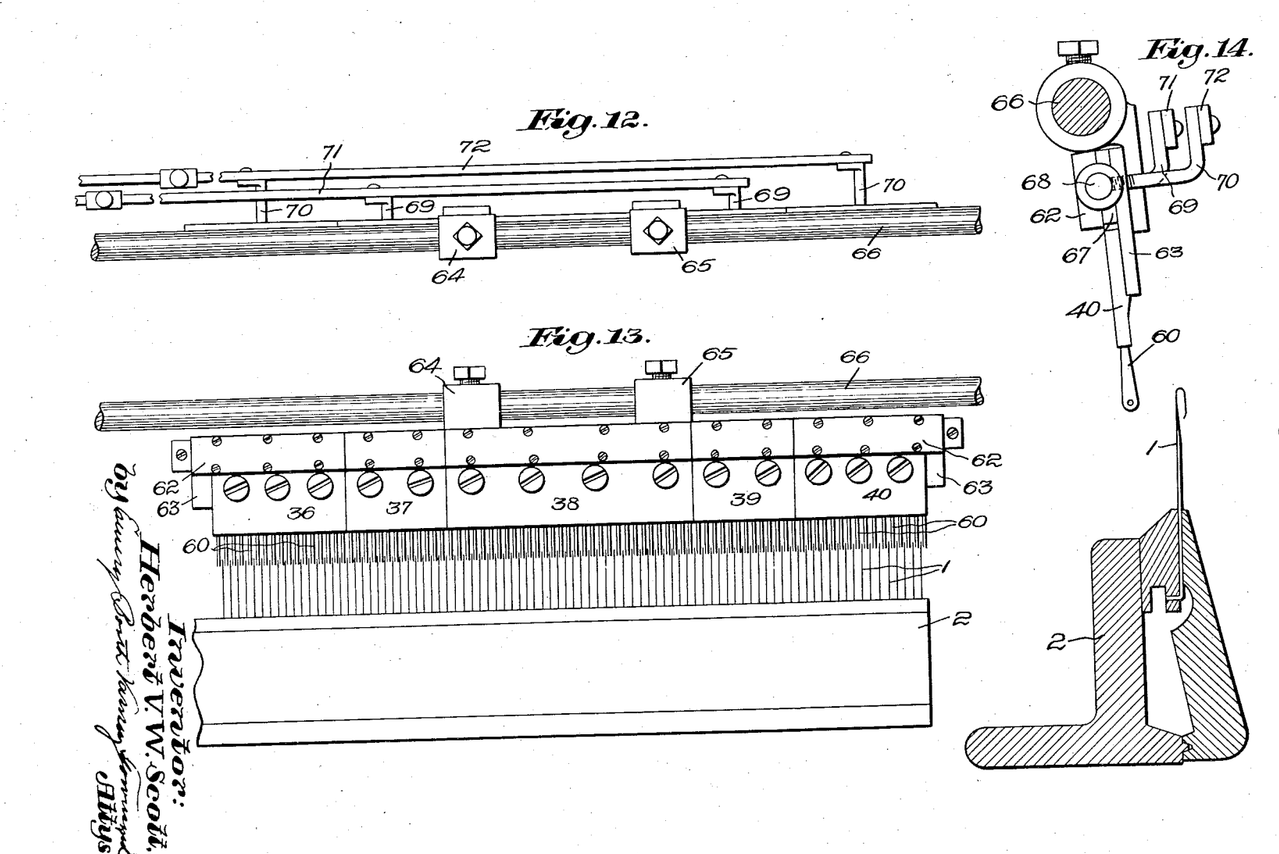
Fig. 12 is a plan view of a part of the means for throwing additional or warp thread fingers in groups out of action to effect shaping or fashioning of the fabric.
Fig. 13 is a front elevation of the mechanism shown in Fig. 12.
Fig. 14 is an end elevation of the mechanism shown in Figs. 12 and 13; on an enlarged scale.
Figure 15:
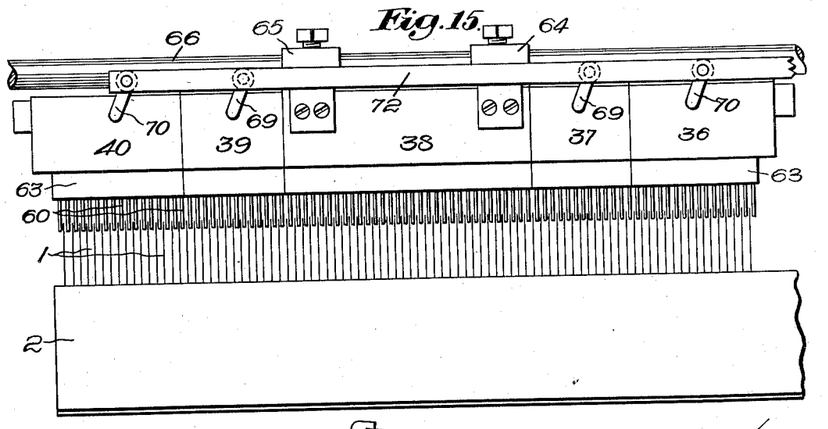
Fig. 15 is a rear elevation of the mechanism shown in Figs. 12, 13 and 14.

I have stated that the blocks 36 to 40 are supported by the members 62, 63 and thence from the rod 66. Viewing Fig. 14, it will be observed that the member 63 constitutes a back plate extending lengthwise. It is made in sections corresponding to the respective length of the blocks 36 to 40. The same is true of the plate 62 which is in substance a covering plate. There is also provided a plate 67 which is between the plate 62 and the plate 63 and that also is made in sections. Said plates 62, 63, 67 are all directly carried by a rod 68 of the length of a section of the machine (that is, of an entire bank of needles). The combined structure 62, 63, 67, together with the warp fingers 60 may be rocked upon the shaft 68 and be held in either functioning or non-functioning position. This is preferably done by a set screw, one for each block 36, 37, 39, 40. I may provide a set screw or screws for each block 36, 37, 39, 40, and tighten or loosen them individually, but in Figs. 14 and 15 I have represented for the purpose set screws 69 pertaining to the blocks 36, 40 and set screws 71 pertaining to the blocks 37, 39. Said set screws are upturned as indicated in Fig. 14, and the set screws of the corresponding blocks are connected to bars 71, 72 extending the entire length of the machine or one half the length thereof, and duplicated at the other half. Thus by moving the bars 71, 72, in one direction or the other, the blocks 36, 40 throughout the entire machine may at one time be swung into non-functioning position and at another time the blocks 37, 39 may be swung into non-functioning position. Any other suitable means may be provided to swing or permit the manual swinging of each set of blocks 36, 40 throughout the machine when the knitting has progressed down to the line 8—8 of Fig. 1 and for swinging or permitting the manual swinging of each set of blocks 37, 39 when the knitting has progressed down to the end of the heel tabs.

The rod 66 constitutes a shaft which is given an axial movement and a rocking movement for the same purpose and preferably in the same manner as described in the co-pending application of Carlson, Serial No. 627,447, filed substantially simultaneously herewith.

Figure 6:
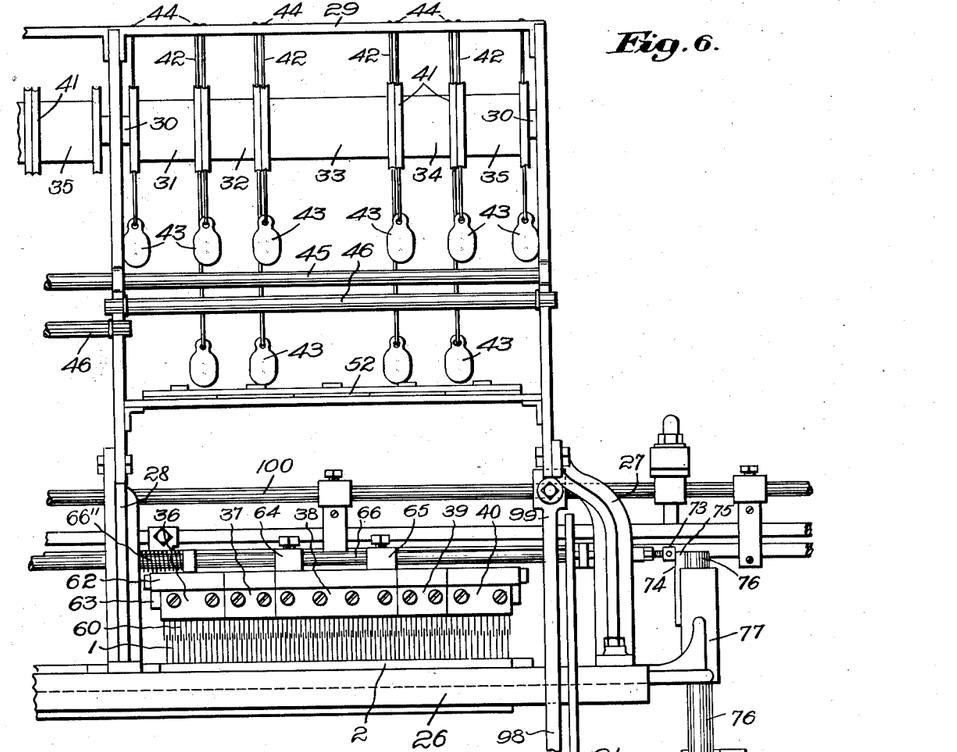
Fig. 6 is a front elevation of the right hand end portion of the well known Reading machine having my invention applied thereto.
Figure 7:
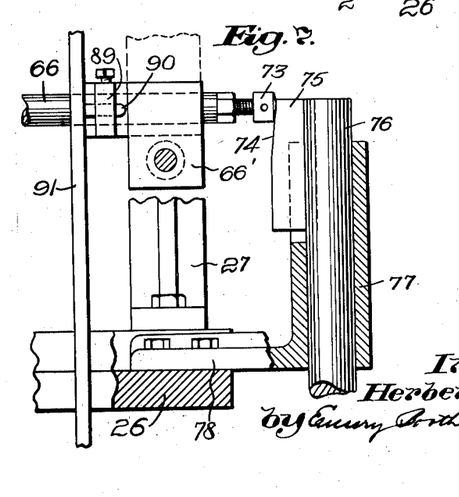
Fig. 7 is an enlarged detail mainly in vertical section, of a portion of the means for imparting longitudinal movement to the rod or bar carrying the fingers for the additional or warp thread to be incorporated into each needle wale of the fabric.

To impart the axial movement, said rod or shaft 66 which is supported in suitable bearings 66', one of which is indicated in Fig. 7, is provided at one end with a set screw 73. The set screw takes against the inclined face 74 of the head 75 at the upper end of a vertical spindle or shaft 76 mounted to be moved axially in a suitable bearing or guide 77 secured upon the framing 26 as indicated at 78 in Fig. 7. The shaft 76 has pivoted thereto an upright link 79 shown in Fig. 6, and in Fig. 8. At its lower end said link is vertically slotted as indicated at 80 in Fig. 8 and is there secured by a pin 81 to a lever arm 82 pivoted at 83 in the framing and normally held downward by a suitable spring 84. Upon said lever arm 82 is a roll 85 resting upon a cam 86 fast upon the main cam shaft 87. Said cam 86 is provided with a projection 88 which rides under the roll 85 and at the proper times lifts the rod or upright shaft or stud 76 so as to impart axial movement to the shaft or rod 66. Said rod 66 is moved in the opposite direction by a suitable coil spring 66'' shown in Fig. 6.

In order to impart a suitable rocking movement to the shaft or rod 66, so that each warp finger may describe a substantially rectangular path about its corresponding needle, said shaft 66 has fast thereon a link 89 which is secured preferably removably by a pin 90 to an upright bar or member 91. Said member at its lower end is provided with a roll 92 which as shown in Figs. 6 and 8 rest upon the periphery of a cam 93 having a concavity 94 controlling the up and down movement of the member 91 and consequently the rocking movement of the rod or shaft 66. The timing of the parts is such and the relative location of the point or projection 88 and the concavity 94 are such that the proper rectangular movements are given to the warp thread guides 60.

I provide also upon the shaft 87 a cam for imparting the proper dipping movements to the narrowing points 61. For this purpose upon the main cam shaft 87 is provided a suitable cam 95, upon the periphery of which rests a roll 96 upon a lever arm 97 pivoted also at 83. Pivotally connected to the lever arm 97 is an upright link 98 which at its upper end, as indicated at 99, is secured to the rod or bar 100 that supports the narrowing point structure.

The narrowing points 61, 61 shown in Fig. 11, may be moved in any suitable manner to effect the transfer of stitches indicated in Figs. 1 and 5. For the purpose I have in Figs. 10 and 11 indicated two bars 101 and 102 which are respectively connected to nuts 103, 104, upon the oppositely threaded portions 105, 106 of the shaft 107, which by means of the ratchets 108 and 109 is turned in opposite directions at the proper times, automatically. A holding wheel 110 is also provided upon said shaft 107.

Figure 25:
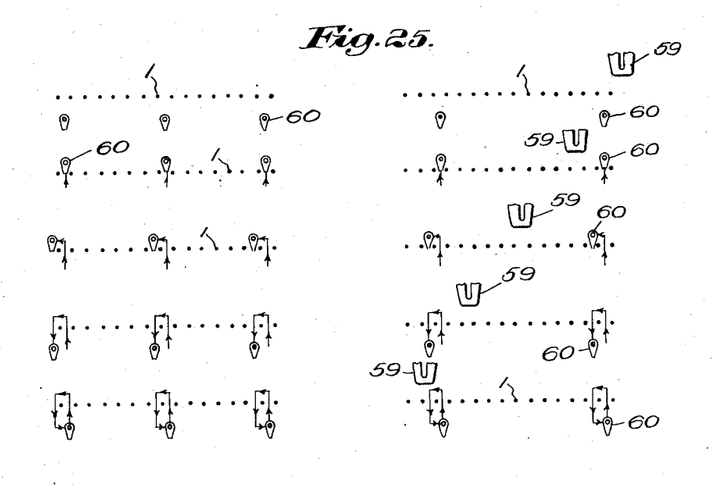
Fig. 25 is a diagrammatic plan view of some of the needles of one section of the machine and indicating the relative positions of the main knitting thread guide or carrier, and several of the additional or warp thread fingers in the act of laying their additional or warp threads onto the appropriate needles.

In Fig. 25 I have diagrammatically indicated the traverse of the main thread carrier 59 along the bank of needles 1. I have also indicated certain of the warp thread fingers 60 and the rectangular movement of said warp thread fingers each about its own needle. It will be understood that the traverse of the main thread carrier across the bank of needles starts substantially simultaneouly with the commencement of the thread laying operation of the warp threads 6. It will also be understood that each warp thread 6 is laid once about its needle for each course of the main knitting thread, whether that course starts from the right or from the left end of the bank of needles. The knitting needles commence their descent immediately after each course of the main knitting thread is laid. Each warp thread 6 may be wrapped about its needle in the direction indicated by the arrow heads in Fig. 25, or in the opposite direction. For convenience, I prefer to thread the warp threads through the fingers 60 from the right, but they may be threaded from the right or the left. While the said warp threads are being wrapped about their respective needles 1, said needles are at their highest position.

I desire it to be understood that the feature of my invention which involves the transfer of stitches inward by the narrowing points is not limited to use only in making the precise form or shape of stocking blank, if any, disclosed in the drawings, inasmuch as my invention is not limited to the making of only the shape of stocking blank shown, and the portion of the fabric that is to be trimmed away may be varied from that shown in Fig. 1.

Obviously my invention is not limited to the introduction of a separate warp thread one to each needle wale and confined thereto since the purpose of the invention being to obtain a non-run or strongly run-resistant fabric this may, within the scope of my invention, be obtained by introducing the warp threads in number sufficiently approximating the total number of needle wales to render the fabric of a non-run or strongly run-resistant character.

Having thus described one illustrative embodiment of the mechanism of my invention and the resulting fabric, as well as the preferred manner for practicing the method of my invention, it is to be understood that although specific terms are employed, they are used in a generic and descriptive sense and not for purposes of limitation, the scope of the invention being set forth in the following claims.

I claim:

1. In a full-fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale so as to render the fabric of a strongly run-resistant character by the introduction of their warp threads into the respective needle wales coincidently with the laying of the respective courses of said loops; means to support said fingers in a series of substantially five groups whereof the middle group is constantly in operation and substantially two groups at either side thereof which may be moved into non-feeding position; and means to impart a simultaneous warp introducing movement to all those fingers that are in feeding position and including means to continue the knitting of substantially all the needle wales of the fabric that are outside of the leg narrowings to at least the end of the usual leg narrowing zone so that the fabric is of the full width past said leg narrowing zone with their respective warp threads in their wales and means to transfer stitches composed of the main thread and warp threads as described, inward at points corresponding to usual leg narrowings to provide indications for trimming.

2. In a full-fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale so as to render the fabric of a strongly run-resistant character by the introduction of their warp threads into the respective needle wales coincidently with the laying of the respective courses of said loops; means to support said fingers in a series of substantially five groups whereof the middle group is constantly in operation and substantially two groups at either side thereof which may be moved into non-feeding position; means for moving one of the two endmost groups out of feeding position, and means to impart a simultaneous warp introducing movement to all those fingers that are in feeding position and including means to continue the knitting of substantially all the needle wales of the fabric that are outside of the leg narrowings to at least the end of the usual leg narrowing zone so that the fabric is of the full width past said leg narrowing zone with their respective warp threads in their wales and means to transfer stitches composed of the main thread and warp threads as described, inward at points corresponding to usual leg narrowings to provide indications for trimming.

3. In a full-fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale so as to render the fabric of a strongly run-resistant character by the introduction of their warp threads into the respective needle wales coincidently with the laying of the respective courses of said loops; means to support said fingers in a series of substantially five groups whereof the middle group is constantly in operation and substantially two groups at either side thereof which may be moved into non-feeding position; manual means for separately moving the two groups at each side of the fixed middle group successively into non-feeding position, and means to impart a simultaneous warp introducing movement to all those fingers that are in feeding position and including means to continue the knitting of substantially all the needle wales of the fabric that are outside of the leg narrowings to at least the end of the usual leg narrowing zone so that the fabric is of the full width past said leg narrowing zone with their respective warp threads in their wales and means to transfer stitches composed of the main thread and warp threads as described, inward at points corresponding to usual leg narrowings to provide indications for trimming.

4. In a full-fashioned hosiery knitting machine having spring beard needles and cooperating sinkers, etc. to form successive courses of regular loops of a main knitting thread; main thread carrier means to traverse said main thread from edge to edge of the hosiery blank and including means to shorten said traverse at the termination of the leg narrowings; warp thread guiding fingers to introduce separate warp threads into the needle wales of the fabric coincidently with the laying of the respective courses of the loops of the main knitting thread; means to support said fingers in a series of a relatively small number of groups, whereof the middle group is constantly in operation, and whereof the two end groups may be moved into non-feeding position, and means for laterally shifting or transferring inward stitches of the main knitting thread and the correlated warp threads at substantially the usual narrowing points.

5. In a full-fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers to introduce separate warp threads, one into each needle wale of the fabric, coincidently with the laying of the respective courses of the loops of the main knitting thread; means laterally to transfer or shift loops of the main and warp threads inward at substantially the leg narrowing positions; and means for manually moving into non-feeding position one or more groups of said fingers during the knitting of the blank.

6. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale, so as to render the fabric of a strongly run-resistant character by the introduction of their warp threads into the respective needle wales, so that the stitches are respectively composed of the main knitting thread and the respective warp threads, and whereby the warp threads are so introduced into the needle wales coincidently with the laying of the respective courses of the said loops; means to support the said warp thread guiding fingers in a series consisting of a small number of groups, including a central group, always in action and subsidiary groups at either side thereof, and a series of warp thread beams corresponding in number to the number of groups of warp thread guiding fingers, whereby the warp threads for said respective sets of guiding fingers are separately controlled.

7. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, which in number sufficiently approximate the number of needle wales so as to render the fabric of a non-run or strongly run-resistant character by reason of the introduction of warp threads into the fabric coincidently with the laying of the respective courses of said loops; means to support said fingers in a series in a small number of groups; means separately to support the warp threads for the respective small number of groups; and means separately to tension the support for each of said several groups of warp threads.

8. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, which in number sufficiently approximate the number of needle wales so as to render the fabric of a non-run or strongly run-resistant character by reason of the introduction of warp threads into the fabric coincidently with the laying of the respective courses of said loops; means to support said fingers in a series in a small number of groups; means separately to support the warp threads for the respective small number of groups; means separately to tension the support for each of said several groups of warp threads; and means for separately manually throwing out of operation small end groups of said series of fingers.

9. In a full fashioned hosiery knitting machine having knitting needles and cooperating sinkers, etc. to form successive courses of regular loops in the main knitting thread; main thread carrier means to traverse said main thread from edge to edge of the hosiery blank; warp thread guiding fingers, one for each needle wale, to introduce a separate warp thread into each loop of each needle wale of the fabric coincidently with the laying of the respective courses of said loops; means to support said fingers in a series in a small number of groups; means separately to support the warp threads for the respective small numbers of groups; narrowing points adjacent each selvage portion of the fabric; and means to move said narrowing points toward each other to transfer or shift loops composed of the main thread and the correlated threads, thereby to provide two oppositely inclined lines along which the fabric outside thereof may be subsequently trimmed.

10. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale so as to render the fabric of a strongly run-resistant character by the introduction of their warp threads into the respective needle wales coincidently with the laying of the respective courses of said loops, means to support said fingers in a series of five groups only whereof the middle group is constantly in operation and contains fingers sufficient for that central portion of the fabric which is of the width of the instep of the fabric and whereof the two groups at either side of the central group carry the warp thread fingers that supply the warp threads respectively to the heel tabs and to the edge portions of the fabric comprehended within the leg narrowings and which may be moved into the non-feeding position; and means to impart simultaneous warp introducing movement to all those fingers that are in feeding position and including means to continue the knitting of substantially all the needle wales of the fabric that are outside of the leg narrowings, to at least the end of the usual leg narrowing zone, so that the fabric is of the full width past said leg narrowing zone, with their respective warp threads in their wales.

11. In a full fashioned hosiery knitting machine having spring beard needles and cooperating sinkers, etc. to form successive courses of regular loops of a main knitting thread, main thread carrier means to traverse said main thread guide from edge to edge of the hosiery blank, but including means to traverse the same the full width of the fabric past all the leg narrowings and then abruptly to shorten said traverse to substantially the space between the lower ends of the two lines of narrowing marks or openings; warp thread guiding fingers to introduce separate warp threads one into each needle wale of the fabric coincidently with the laying of the respective courses of the loops of the main knitting thread; and means laterally to transfer or shift loops composed of the main knitting thread and correlated warp threads inward at substantially the leg narrowing positions.

12. In a full fashioned hosiery knitting machine having spring beard needles and cooperating sinkers, etc. to form successive courses of regular loops of a main knitting thread, main thread carrier means to traverse said main thread guide from edge to edge of the hosiery blank, but including means to traverse the same the full width of the fabric past all the leg narrowings and then abruptly to shorten said traverse to substantially the space between the lower ends of the two lines of narrowing marks or openings; warp thread guiding fingers to introduce separate warp threads into different needle wales of the fabric respectively coincidently with the laying of the respective courses of the loops of the main knitting thread; and means laterally to transfer or shift loops composed of the main knitting thread and correlated warp threads inward at substantially the leg narrowing positions.

13. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale, so as to render the fabric of a strongly run-resistant character by the introduction of their warp threads into the respective needle wales, so that the stitches are respectively composed of the main knitting thread and the respective warp threads, and whereby the warp threads are so introduced into the needle wales coincidently with the laying of the respective courses of the said loops; means to support together as a unitary structure those central warp thread guiding fingers which introduce warp threads to the central portion of the fabric extending between the narrowings in the leg; and means separately to support at either side of said warp thread fingers those warp thread fingers which supply warp threads to needle wales whereat lateral transfer may occur.

14. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale, so as to render the fabric of a strongly run-resistant character by the introduction of their warp threads into the respective needle wales, so that the stitches are respectively composed of the main knitting thread and the respective warp threads, and whereby the warp threads are so introduced into the needle wales coincidently with the laying of the respective courses of the said loops; means to support together as a unitary structure those central warp thread guiding fingers which introduce warp threads to the central portion of the fabric extending between the narrowings in the leg; and means separately to support at each side of said warp thread fingers those warp thread fingers which supply warp threads to needle wales whereat lateral transfer may occur, transfer points adapted to act upon stitches composed of the main and warp threads delivered by said two last mentioned groups of warp thread fingers, and means to operate said transfer points so as to transfer stitches inwardly.

15. In a full fashioned hosiery knitting machine having spring beard needles and cooperating sinkers, etc. to form successive courses of regular loops of a main knitting thread; main thread carrier means to traverse said main thread from edge to edge of the hosiery blank; warp thread guiding fingers, one for substantially each needle wale, so as to render the fabric of a strongly run-resistant character by the introduction of their warp threads into the respective needle wales, so that the stitches are respectively composed of the main knitting thread and the respective warp threads, and whereby the warp threads are so introduced into the needle wales coincidently with the laying of the respective courses of the said loops; means to support together as a unitary structure those central warp thread guiding fingers which introduce warp threads to the central portion of the fabric extending between the narrowings in the leg; means separately to support at each side of said warp thread fingers those warp thread fingers which supply warp threads to needle wales whereat lateral transfer may occur, transfer points adapted to act upon stitches composed of the main and warp threads delivered by said two last mentioned groups of warp thread fingers, means to operate said transfer points so as to transfer stitches inwardly, means to support upon a single warp beam all those warp threads which are supplied to the warp thread fingers for the central portion of the fabric, and separate warp thread beams at the opposite sides of said central warp thread beam to support the warp threads that are supplied to the said warp thread fingers at the respective sides of the central warp thread beam; and means for separately tensioning the said several warp thread beams.

HERBERT V. W. SCOTT.